United States Patent
Rakic

(10) Patent No.: US 8,615,635 B2
(45) Date of Patent: Dec. 24, 2013

(54) DATABASE MANAGEMENT METHODOLOGY

(75) Inventor: Milan Rakic, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1371 days.

(21) Appl. No.: 11/620,126

(22) Filed: Jan. 5, 2007

(65) Prior Publication Data

US 2008/0168103 A1 Jul. 10, 2008

(51) Int. Cl.
*G06F 12/00* (2006.01)
*G06F 13/00* (2006.01)
*G06F 13/28* (2006.01)

(52) U.S. Cl.
USPC ............ 711/133; 711/113; 711/118; 711/136

(58) Field of Classification Search
USPC .......................................... 711/113, 118–136
See application file for complete search history.

(56) References Cited

U.S. PATENT DOCUMENTS

| | | | |
|---|---|---|---|
| 5,151,989 A * | 9/1992 | Johnson et al. ................. | 707/10 |
| 5,542,066 A * | 7/1996 | Mattson et al. ............... | 711/136 |
| 5,778,442 A * | 7/1998 | Ezzat et al. .................... | 711/159 |
| 6,141,731 A | 10/2000 | Beardsley et al. | |
| 6,941,308 B1 * | 9/2005 | Chilton ........................ | 707/100 |
| 2005/0138407 A1 * | 6/2005 | Choudhary ................... | 713/200 |
| 2005/0172080 A1 * | 8/2005 | Miyauchi ..................... | 711/136 |

FOREIGN PATENT DOCUMENTS

EP 0 706 135 A1 4/1996

OTHER PUBLICATIONS

Knuth, D. E. "Sorting and Searching", The Art of Computer Programming, vol. III.; 1998, pp. 80-105.
International Search Report and Written Opinion dated Apr. 29, 2008 issued in corresponding PCT application No. PCT/IB2007/052656, 16 pages.

* cited by examiner

*Primary Examiner* — Yaima Rigol
(74) *Attorney, Agent, or Firm* — Snyder, Clark, Lesch & Chung, LLP

(57) ABSTRACT

A method and system for enabling enhanced memory management are provided. A cache memory may be populated with a sorted list of data elements corresponding to a number of oldest records in a database. Upon receipt of a request to add a record to a full database, the cache may be examined to determine the oldest record in the database. The record may be deleted and the corresponding data element in the cache may be removed from the sorted listing and associated with a floating data element pointer.

25 Claims, 6 Drawing Sheets

DATABASE MANAGEMENT METHODOLOGY

TECHNICAL FIELD OF THE INVENTION

The invention relates generally to database configuration and management and, more particularly, to an improved method for managing memory resources during database modifications.

DESCRIPTION OF RELATED ART

Maintenance of memory structures can require significant processing and memory resources. For example, an application may allocate memory resources from a pool of available resources for use in executing the application. Although advantageous, not all applications properly de-allocate the used resources in a timely manner, thereby causing memory sinks and reduced performance.

Convention memory management systems provide for reclamation of memory resources by using so-called "garbage collection" techniques. Known garbage collection techniques periodically identify memory resources that are not likely to be called in the future and de-allocate these resources for subsequent use by other processes or applications. Unfortunately, such autonomous garbage collection techniques may suffer negative performance implications by requiring periodic processing resources to operate and by temporarily freezing all allocated resources during a time that the resource may be required.

Additionally, in the field of database management, fixed size databases may require garbage collection type handling to ensure that new records may be added to the database while unnecessary records are accurately and efficiently pruned. Unfortunately, automated garbage collection techniques do not provide for efficient management without undue performance implications.

SUMMARY

According to one aspect, a method may include populating a cache with a plurality of data elements pointing to a plurality of records in a memory structure; identifying a data item pointing to the oldest record in the memory structure; removing the oldest record from the memory structure; and removing the data element pointing to an oldest record in the memory structure from the cache.

Additionally, the plurality of data elements may include N data elements and the plurality of records in the memory structure may include N oldest records in the memory structure, where N is an integer.

Additionally, the method may include sorting the plurality of data elements in the cache based on an age of the associated records in the memory structure; associating a head pointer to the data element pointing to the oldest record in the memory structure, where the identifying the data element pointing to the oldest record in the memory structure comprises identifying the data element associated with the tail pointer; and associating a tail pointer with the data element pointing to the newest record in the cache.

Additionally, the records in the memory structure and the associated data elements in the cache may each include timestamps indicative of a time of last access of the record, and the sorting of the plurality of data elements may be performed based on the timestamps.

Additionally, the sorting the plurality of data elements may further include providing a next pointer in each data element pointing to a following data element in the cache; and providing a previous pointer in each data element pointing to a preceding data element in the cache.

Additionally, the removing the data element pointing to the oldest record in the memory structure from the cache may further include associating a floating data element pointer to the data element previously associated with the head pointer, wherein the floating data element list maintains a memory allocation previously relating to data element pointing to the oldest record in the memory structure; and associating the head pointer to a data element referenced by the next pointer in the data element currently associated with the head pointer.

Additionally, the populating the cache may further include determining whether the cache is full; determining whether a current record is older than the data element reference by the tail pointer; and performing the following when it is determined that the current record is older than the data element referenced by the tail pointer: assigning a floating node pointer to the data element reference by the tail pointer; rewriting the data element referenced by the tail pointer to point to the current record; assigning the tail pointer to a next newest data element in the cache; identifying a sorted position for the data element referenced by the floating node pointer; and inserting the data element referenced by the floating node pointer into the cache.

Additionally, the identifying a sorted position for the data element referenced by the floating node pointer includes comparing the timestamps of the data element referenced by the floating node pointer to the timestamps of data elements in the cache.

Additionally, the method may include determining whether the memory structure is full; and populating the cache when it is determined that the memory structure is full.

Additionally, the method may include determining whether the cache should be populated; and populating the cache when it is determined that the cache should be populated.

Additionally, the cache may include a doubly linked list including the plurality of data elements, and wherein the cache further comprises a floating data element pointer configured to reference data elements detached from the doubly linked list.

Additionally, the determining whether the cache should be populated may include determining whether the doubly linked list is empty.

Additionally, the determining whether the doubly linked list is empty, may include counting a number of cache accesses; and determining when the number of counter accesses is a multiple of a total number of data elements in the cache.

Additionally, the method may include determining whether the memory structure is full; and determining whether the cache should be populated when it is determined that the memory structure is full.

Additionally, the method may include adding a new record to the memory structure.

Additionally, the memory structure may include a database.

Additionally, the database may be configured to maintain digital rights management information and the database may be maintained in a memory of a mobile computing device.

According to another aspect, a method may include populating a cache with a plurality of nodes pointing to a plurality of records in a memory structure; receiving a request to update a record from the memory structure; determining whether an age of the record to be updated is more recent than an age of the most recent node in a plurality of nodes; and determining whether a node in the plurality of nodes is associated with the record to be deleted when it is determined that the age of the record to be updated is not more recent than the most recent node in a plurality of nodes.

Additionally, the cache may include a doubly linked list where each node in the plurality of nodes includes a next pointer pointing to a next oldest node and a previous pointer pointing to a next newest node.

Additionally, the request to update a record may include a request to delete a record.

Additionally, the method may include rewriting a next pointer associated with the node identified in the previous pointer of the node associated with the record to be deleted to point to the node identified in the next pointer of the node associated with the record to be deleted; rewriting a previous pointer associated with the node identified in the next pointer of the node associated with the record to be deleted to point to the node identified in the previous pointer of the node associated with the record to be deleted; adding the node associated with the record to be deleted to a floating node list; and removing the record to be deleted from the memory structure.

Additionally, the request to update a record may include a request to modify a record.

Additionally, the method may include rewriting a next pointer associated with the node identified in the previous pointer of the node associated with the record to be deleted to point to the node identified in the next pointer of the node associated with the record to be modified; rewriting a previous pointer associated with the node identified in the next pointer of the node associated with the record to be deleted to point to the node identified in the previous pointer of the node associated with the record to be modified; and adding the node associated with the record to be modified to a floating node list.

According to yet another aspect, a computer-readable medium having stored thereon sequences of instructions executable by at least one processor, may include one or more instructions for receiving a request to add a record to a database; one or more instructions for determining whether the database is full; one or more instructions for identifying a data element in a cache memory pointing to an oldest record in the database when it is determined that the database is full; one or more instructions for removing the oldest record from the database; one or more instructions for removing the identified data element in the cache memory; and one or more instructions for adding the record to the database.

Additionally, the computer-readable medium may include one or more instructions for determining whether the cache memory should be populated; and one or more instructions for populating the cache memory with a plurality of nodes pointing to a corresponding plurality of records in the database, wherein the corresponding plurality of records in the database comprise the oldest records in the database.

Additionally, the one or more instructions for determining whether the cache memory should be populated may further include one or more instructions for determining that the database is full; and one or more instructions for determining whether a cache access counter value is a multiple of a maximum number of nodes in the cache memory.

According to still another aspect, a method may include receiving a request to add a node to a sorted list of nodes, wherein the sorted list of nodes is sorted based on timestamps associated with the nodes, with a head node representing an oldest node in the sorted list and a tail node representing a newest node in the sorted list; determining whether the node to be added is older than the tail node; assigning a floating pointer to the tail node when it is determined that the node to be added is older than the tail node in the sorted list; rewriting the tail node to represent the node to be added; rewriting a tail pointer to point to a next newest node in the sorted list; identifying a sorted position for the node to be added in the sorted list; and inserting the node to be added into the sorted list at the identified sorted position.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary System

Figure 1:
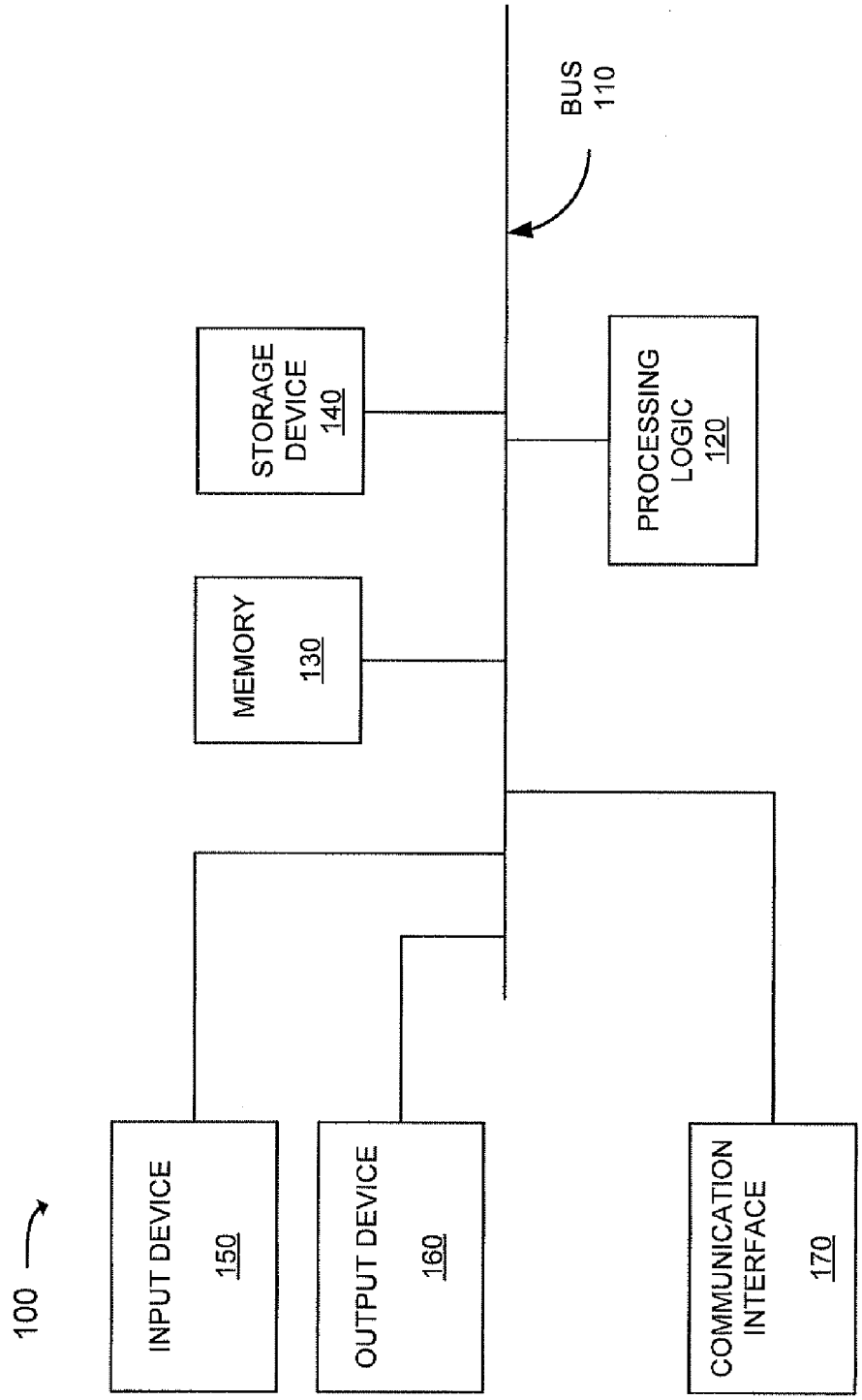
FIG. 1 is a diagram of an exemplary computing system in which methods and systems consistent with the aspects described herein may be implemented.

FIG. 1 is a diagram of an exemplary computing system 100 in which aspects described herein may be implemented. Computing system 100 may include a bus 110, processing logic 120, a memory 130, a storage device 140, an input device 150, an output device 160, and communication interface 170. Bus 110 permits communication among the components of computing system 100. One skilled in the art would recognize that computing system 100 may be configured in a number of other ways and may include other or different elements. For example, computing system 100 may include one or more power supplies (not shown). Computing system 100 may also include a modulator, a demodulator, an encoder, a decoder, etc., for processing data (not shown).

Computing system 100 may include any type of conventional computing device capable of processing instructions. For example, computing system 100 may include any type of device that is capable of transmitting and receiving data (e.g., voice, text, images, multi-media data) to/from a network (not shown). In an exemplary implementation, computing system 100 may be a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; a thin client computer device configured to perform as an interface to another device over a computer network; and a conventional laptop and/or palmtop receiver or other appliance that includes a radiotelephone transceiver. Mobile terminals may also be referred to as "pervasive computing" devices.

In an alternative implementation, computing system 100 may include a device such as a personal computer (PC), a laptop computer, a PDA, a web-based appliance, a portable media player, etc., that is able to receive and manipulate data stored thereon. In one implementation, computing system 100 may communicate with other computing systems over a network via wired, wireless or optical connections.

Processing logic 120 may include a processor, microprocessor, an application specific integrated circuit (ASIC), field programmable gate array (FPGA) or the like. Processing logic 120 may execute software instructions/programs or data structures to control operation of computing system 100.

Memory 130 may include a random access memory (RAM) or another type of dynamic storage device that stores information and instructions for execution by processing logic 120; a read only memory (ROM) or another type of static storage device that stores static information and instructions for use by processing logic 120; a flash memory (e.g., an electrically erasable programmable read only memory (EEPROM)) device for storing information and instructions; and/or some other type of magnetic or optical recording medium and its corresponding drive. Memory 130 may also be used to store temporary variables or other intermediate information during execution of instructions by processing logic 120. In one implementation consistent with aspects described herein, memory 130 may maintain or otherwise store one or more memory structures (e.g., database structures) usable by processing logic 120. In one implementation, these database structures may be configured to maintain digital rights management (DRM) information for use by processing logic 120 in handling application requests for data. Details relating to the configuration of memory 130 are described below.

Storage device 140 may include a flash memory (e.g., a NOR or NAND-type EEPROM), a magnetic and/or an optical recording medium and its corresponding drive.

Input device 150 may include any mechanism that permits an operator to input information to computing system 100, such as a keypad, a microphone, a keyboard, a mouse, a pen, voice recognition and/or biometric mechanisms, a barcode reader or scanner, a visual gesture interpreting engine (incorporating, for example, a gyroscope, an accelerometer, etc.), an optical character recognition (OCR) engine, a handwriting recognition mechanism, etc. Input device 150 may also include one or more buttons that allow a user to receive a menu of options via output device 160. The menu may allow the user to select various functions or modes associated with applications executed by computing system 100. Output device 160 may include one or more conventional mechanisms that output information to the user, including a display, a printer, one or more speakers, etc.

Communication interface 170 may include a transceiver-like mechanism that enables computing system 100 to communicate with other devices and/or systems. For example, communication interface 170 may include a modem or an Ethernet interface to a LAN. Alternatively, communication interface 170 may include other mechanisms for communicating via a network, such as a wireless network. For example, communication interface 170 may include one or more radio frequency (RE) transmitters and receivers and/or transceivers for communicating via a wireless or cellular network.

Computing system 100, consistent with aspects described herein, may dynamically manage resources of memory 130 in handling database modifications. Details relating to this processing will be described below. Computing system 100 may perform these operations in response to processing logic 120 executing sequences of instructions contained in a computer-readable medium, such as memory 130. Such instructions may be read into memory 130 from another computer-readable medium via, for example, communication interface 170. A computer-readable medium may include one or more memory devices and/or carrier waves. In alternative embodiments, hard-wired circuitry may be used in place of or in combination with software instructions to implement processes consistent with the invention. Thus, implementations consistent with the invention are not limited to any specific combination of hardware circuitry and software.

Figure 2:
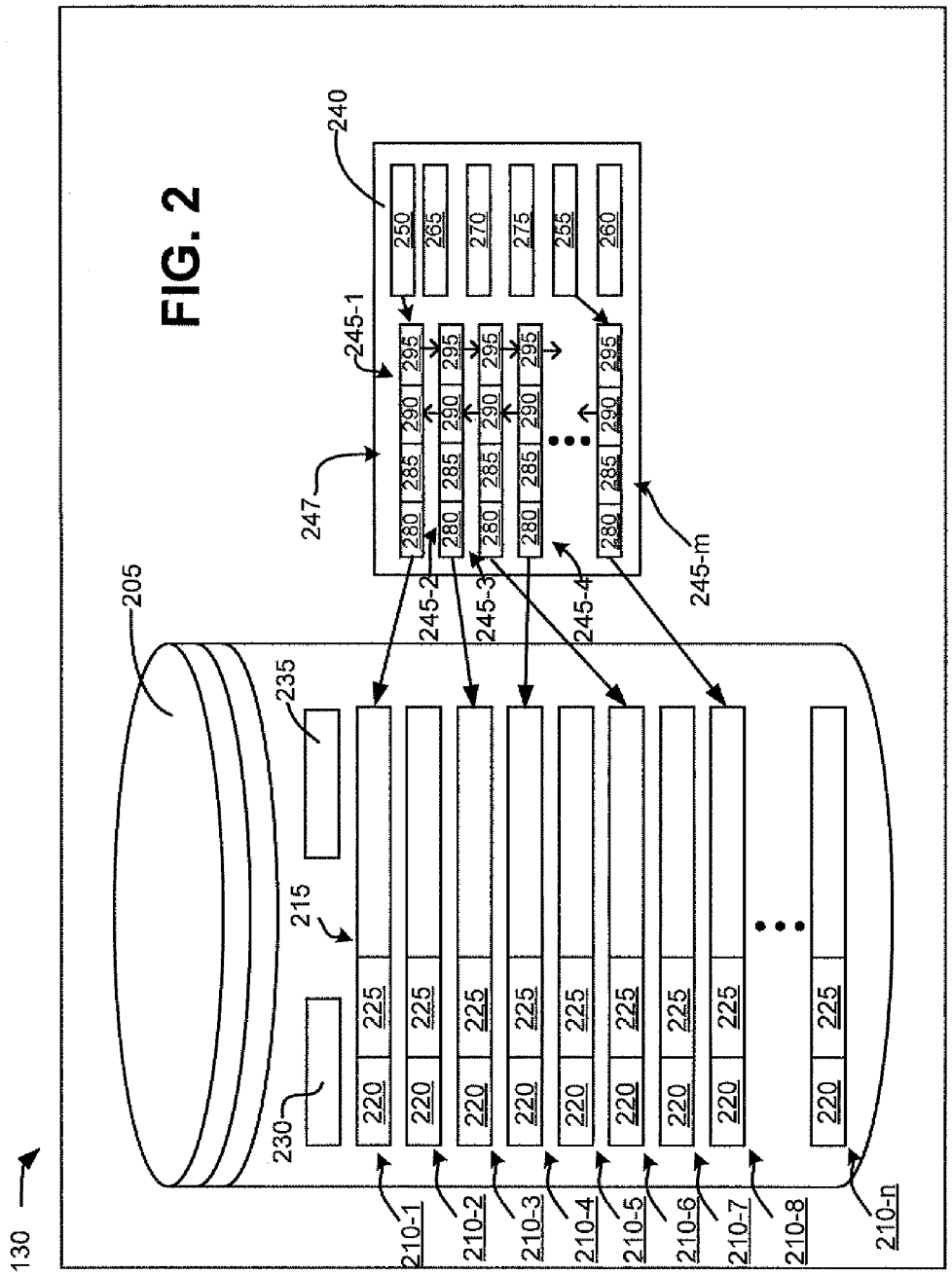
FIG. 2 is an exemplary block diagram illustrating one embodiment of the memory of FIG. 1.
Figure 3:
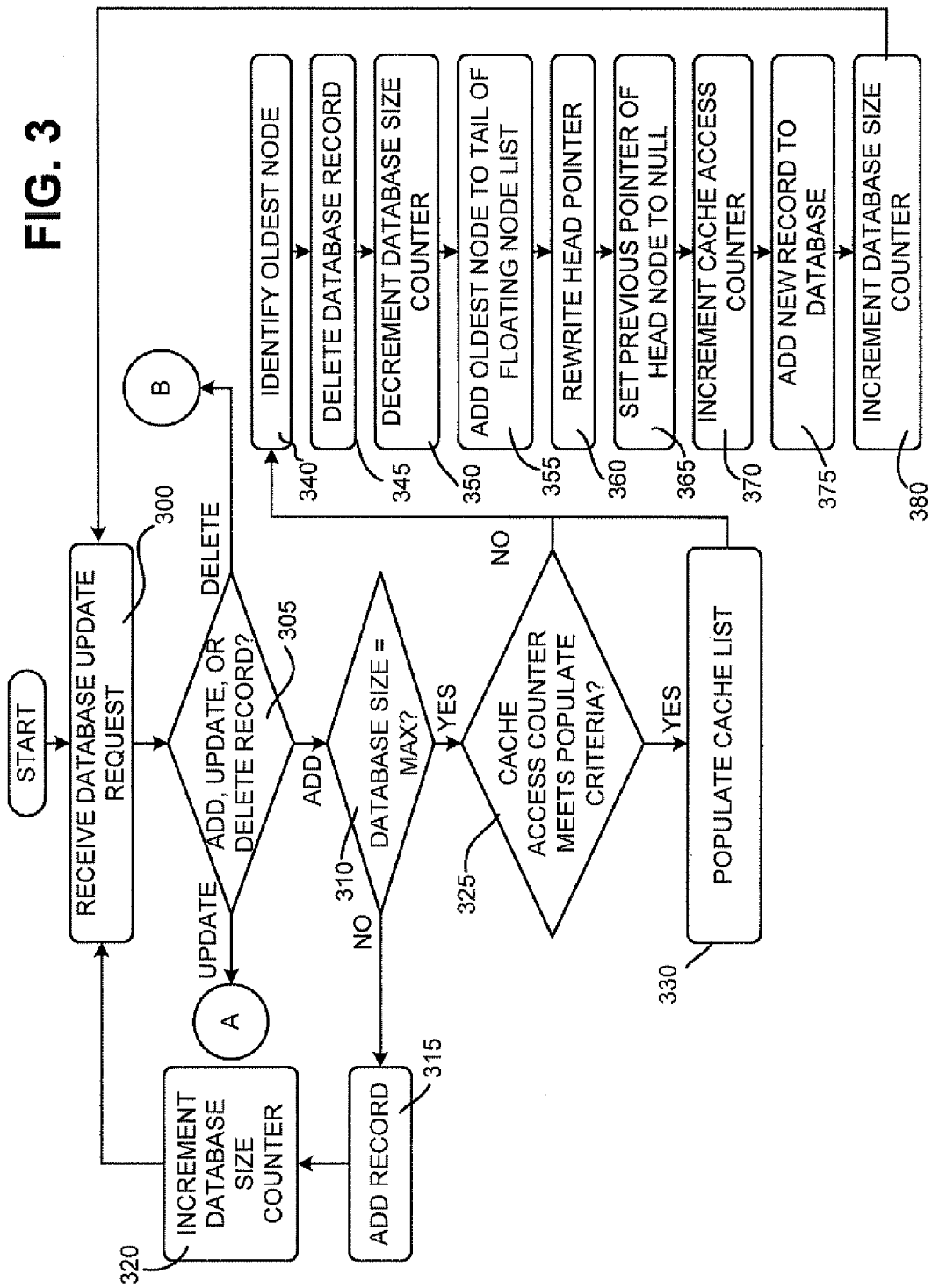
FIGS. 3-6 are flow diagrams illustrating exemplary processing by computing system consistent with the aspects described herein.

FIG. 2 is an exemplary block diagram illustrating one embodiment of memory 130. As briefly described above, memory 130 may be configured to include a database 205 having a number of database records 210-1 through 210-$n$ (collectively referred to as database records 210). In one implementation, database 205 may have a fixed size within memory 130 corresponding to a fixed number (n) of possible database records 210.

In one embodiment, database records 210 may relate to digital rights management (DRM) permissions or other data for use by processing logic 120 in a mobile computing system 100. In a mobile computing system implementation, requirements for both speed and performance enhance the need for rapid and low cost database management methodology.

Each database record 210 may include various data elements fields 215, including a key field 220 that uniquely identifies each record within the database 205 and a timestamp field 225 that indicates the last time each record 210 was accessed or updated. In one embodiment, records 210 may also include one or more VRM permission information fields for maintaining DRM information for use by processing logic 120.

In addition to records 210, database 205 may include a database size counter 230 and a cache access counter 235. The role of database size counter 230 and cache access counter 235 in management of database 205 will be described in detail below.

Memory 130 may also include a cache 240 configured to include a number of data elements or "nodes" 245-1 through 245-$m$ (collectively referred to as nodes 245). In addition to nodes 245, cache 240 may include a head pointer 250 designating an oldest node 245, a tail pointer 255 designating a newest node 245, a floating node pointer 260, a maximum cache size variable 265, a current cache size variable 270, and a node-item key-size variable 275.

Consistent with aspects described herein, each node 245 may be allocated from memory 130 in a conventional manner. As will be described in detail below, when database 205 has been filled, nodes 245 in cache 240 may be populated to reference the oldest m records in database 205, based on the timestamp fields 225 in database records 210. A listing of nodes 245 referencing database records 210 may be referred to as a cache list 247. Following population of cache list 247, subsequent modifications to database 205 may be made based on the content of cache list 247.

In one embodiment, nodes 245 in cache list 247 may be implemented as a doubly linked list, with each node 245 including pointers to both previous and next nodes 245 in cache list 247. Each node 245 in cache list 247 may include a key pointer 280 identifying a unique key field for an associated database record 210, a timestamp 285 corresponding to timestamp field 225 for the identified database record 210, as well as previous and next pointers 290 and 295, respectively, indicating each node 245's position within cache list 247 and facilitating sorting of cache list 247. In one implementation, cache list 247 may be sorted based on timestamps 255, such that an oldest node 245 is reference by head pointer 250, while a newest node 245 is referenced by tail pointer 255.

As will be described in detail below, floating node pointer 260 may be used to facilitate efficient sorting of nodes 245 without requiring unnecessary memory allocations and de-allocations from a pool of available node resources. Essentially, the memory allocations to nodes 245 are fixed, with a total number of nodes 245 equaling the maximum number of database records 210 identified as "old" records by cache 240. In the above embodiment, this number is designated by the variable m.

More specifically, upon initial chronological population of nodes 245, it may be determined whether a next record 210 in database 205 (i.e., the $m^{th}+1$ record 210) is older than the node designated by tail pointer 250 (i.e., the newest node in cache list 247). If so, one of the nodes 245 in cache list 247 up to that point must be reassigned to make room for the new pointer. To facilitate this operation, pointer 280 in node 245 designated by tail pointer 250 may be reassigned to the $m^{th}+1$ record 210 in database 205. This node 245 may then be "popped" from cache 240 because it no longer points to the "least oldest" record 210 in database 205. By "popped", it should be understood that the node's previous pointer 290 may be set to null and the next pointer 295 of the previous node 245 in the list may be set to null. Tail pointer 255 may be rewritten to point to the new tail node 245 (as designated in the prior tail node 245's previous pointer 290). Floating node pointer 260 may then be written to point to the previous tail node 245 (now pointing to the $m^{th}+1$ record 210 in database 205) that was "popped" from the linked list of nodes 245, thereby ensuring that the memory allocated to previous tail node 245 is not inefficiently de-allocated.

The list of nodes 245 may then be traversed to identify the new location for the node 245 designated by floating node pointer 260. Once identified, the next pointer 295 of the preceding node 245 and the previous pointer 290 of the subsequent node may be reassigned to point to the node designated by floating node pointer 260 and the floating node pointer may be set to null.

As will be described more completely below, requests for database modifications result in deletion of an oldest node 245 as identified by head pointer 250. Because cache list 247 is sorted such that an oldest database record is identified in its head node, there is no need to traverse database 205 to identity the oldest record. Additionally, once head node 245-$m$ has been identified and the corresponding database record 210 has been deleted, head node 245 may be "popped" and head pointer 250 may be updated to point to the next oldest node.

However, instead of de-allocating the memory resources corresponding to the former head node 245 and allocating new memory resources for a new cache nodes upon later cache re-populations (e.g., from a pool of available memory resources), a list of nodes 245 referenced by floating node pointer 260 may be used to preserve the memory allocations of nodes 245. More specifically, former head node 245 may be added to the tail of a list of floating nodes (the head of which may be referenced by floating node pointer 260) by rewriting the next pointer 295 of a current tail node in the list of floating nodes and rewriting a previous pointer 290 of the previous head node 245.

By enabling management of database 205 using a parallel, doubly linked cache 240, management may be performed as efficiently as possible, with minimal performance effects. Additionally, updates of cache list 247 performed using a floating node may further increase performance and reduce memory fragmentation by eliminating unnecessary memory de-allocations and allocations. Furthermore, although a list structure has been described in relation to floating node pointer 260, it should be understood that any suitable memory structure may be used, such as an array, a vector, a doubly linked list, a singly linked list, etc.

Exemplary Processing

FIGS. 3-6 are a flow diagrams illustrating exemplary processing by computing device 100 for managing database 205 according to aspects described herein. As initially set forth above, database management performed consistent with implementations described herein may maximize performance of computing device 100 by eliminating unnecessary database processing and memory allocations and de-allocations during maintenance or updating of database 205. The processing of FIG. 3 may be performed by one or more software and/or hardware components within computing device 100.

Processing may begin with processing logic 120 receiving a request to update database 205 (act 300). The received update request may include a request to add, delete, or modify a record in database 205. Typically, such a request may be received as a function call from software executed by processing logic 120. It should be understood that a database update request may be received or implemented in any suitable manner.

Upon receipt of an update request, it may be determined whether the request is for addition of a record 210 to database 205, deletion of a record 210 from database 205, or update of an existing record 210 in database 205 (act 305).

When a request to add a record 210 to database 205 is received at act 300, it may be determined whether database size counter 230 has reached its maximum, indicating that every available slot in database 205 has been filled (act 310). If not, a record may be added to database 205 (act 315) and the database size counter 230 may be incremented by one (act 320).

When database size counter 230 equals its maximum, it means that the database 205 is full and that a record will need to be deleted prior to storing the new record. This process may begin by determining whether a value associated with cache access counter 235 meets a predetermined value or range of values (act 325). In one implementation, the predetermined value may relate to a mathematical operation performed based on the value of cache access counter 235.

More specifically, act 325 may determine whether (cache access counter value) modulo (total cache size) equals 0, where the total cache size refers to a maximum number of nodes in cache 240. This operation indicates whether a number of cache accesses equals a multiple of the maximum cache size. For example, when a number of cache accesses is zero (e.g., the cache has not yet been populated), this value (0 in this example) modulo any cache maximum (e.g., 10) would be 0, indicating that cache 240 needs to be populated.

If the value of cache access counter 235 meets the predetermined criteria, nodes 245-1 to 245-$m$ of cache list 247 may be populated with pointers or references to the m oldest records 210 in database 205 (act 330). During population, cache list 247 may be sorted from the newest 245-1 to the oldest node 245-$m$ based on timestamps 210. Pointers may be configured in cache 240 to reflect the sorted nodes, with head pointer 250 pointing to a memory address of the oldest node 245-$m$ and tail pointer 255 pointing to a memory address of the newest node 245-1. Details regarding the population of cache list 247 are set forth in additional detail below relating to FIG. 4.

If it is determined in act 325 that cache list 247 had been previously populated (for example, in response to a prior request for addition of a database record 210 to database 205), cache access counter 235 may have a value of 1. Unlike the prior example, 1 modulo 10 (the total exemplary number of nodes in cache 240) is not equal to zero. In this circumstance, cache 240 is not populated (or re-populated) and processing continues to act 340 for database maintenance based on existing cache 240.

Following population (or re-population) of cache 240, oldest node 245-*m* (as designated by head pointer 255) may be identified (act 340). Database record 210 referenced by head node 245-*m* may then be deleted from database 205 (act 345) and database size counter 230 may be decremented to indicate the reduction in database size (act 350).

The oldest node 245-*m* (pointing to the just-deleted record 210) may be detached or popped from the doubly linked cache list 247 by adding the node to a floating node memory structure, such as a singly or doubly linked list, an array, or a vector (the head of which may be designated by floating node pointer 260). Adding node 245-*m* to a parallel list may prevent memory resources allocated to node 245-*m* from being de-allocated at the time of removal from cache 240 (act 355). In one implementation, adding the former oldest node 245-*m* to the floating node list may be performed by writing previous pointer 290 in node 245-*m* to point to a current tail node in floating node list (as determined by traversing the floating node list beginning at the node 245 designated by floating node pointer 260). If no floating nodes exists, floating node pointer 260 may be set to node 245-*m*.

Head pointer 250 may be updated to point to a next oldest node 245 (i.e., the node identified in previous pointer 290 of former floating node 245-*m*) (act 360). Previous pointer 290 of current oldest node 245 (as now designated by head pointer 250) may be set to null, indicating the current oldest node 245 is the first node in cache list 247 (act 365). Cache access counter value 235 may be incremented by one to indicate that a "hit" to cache list 247 has been made (act 370). New record 210 may then be added to database 205 (act 375) and database size counter 230 may be incremented (act 380). Processing may return to act 300 for receipt of the next database update request.

Figure 4:
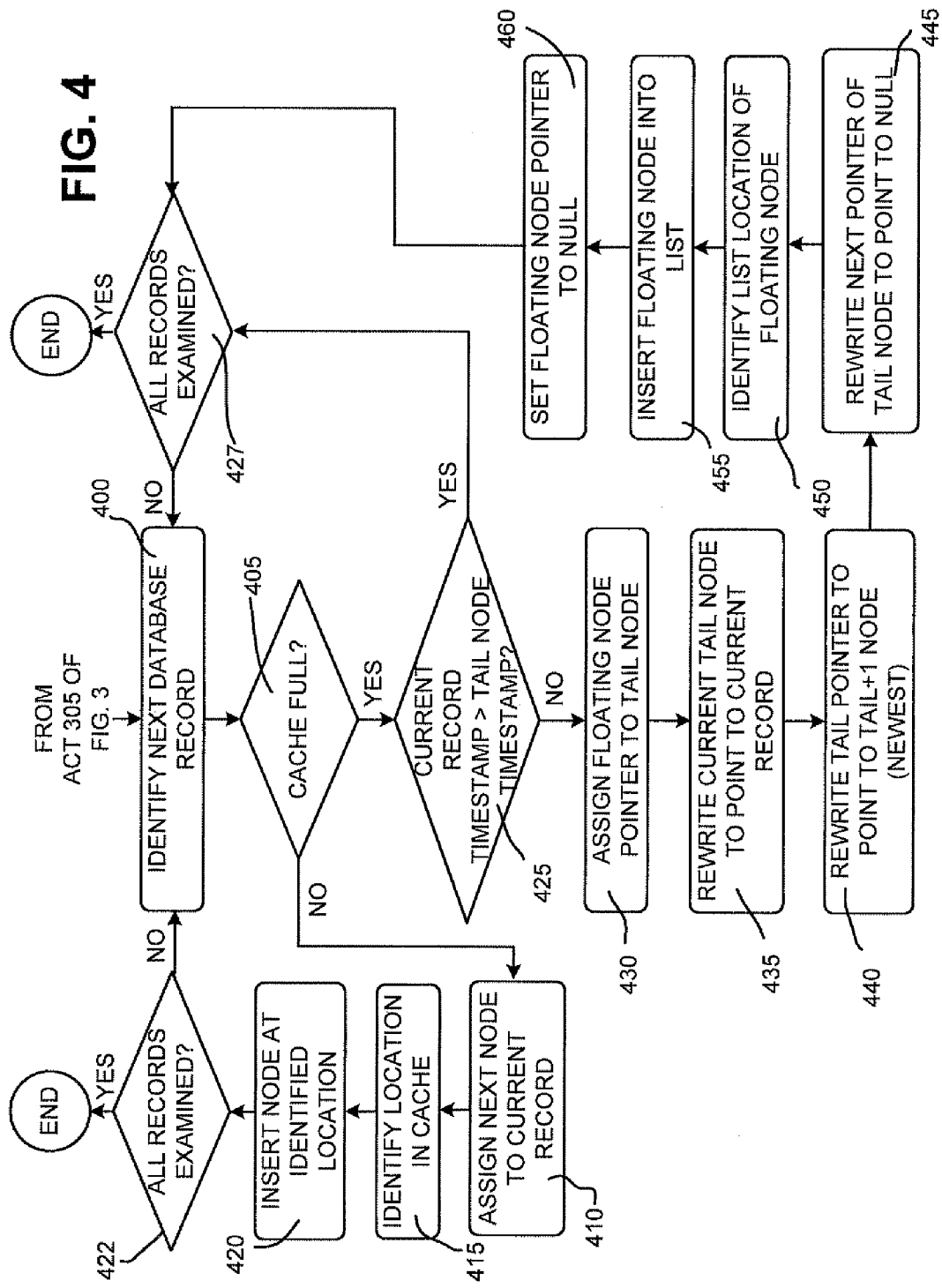

FIG. 4 is a flow diagram illustrating exemplary processing for sorting cache list 247 using floating node pointer 260 in accordance with aspects described herein. Initially, once it is determined that cache list 247 needs to be populated in act 325, a database record 400 may be examined (act 400). It is then determined whether cache list 247 is full (act 405). If not, a next available node 245 in cache list 247 may be assigned to the current record (act 410). A location for the node 245 relating to the current database record may be identified (act 415) and the node is inserted into cache list 247 at the identified location (act 420). In one implementation, identifying a node's properly sorted location in cache list 247 may be performed by comparing a timestamp for the node against timestamps of existing nodes 245 in cache list 247. Once identified, next and previous pointers for the current node, the preceding node, and the following node may be rewritten to facilitate the insertion. It may then be determined whether all database records have been examined (act 422). If so, the process stops. However, if more records remain to be examiner, the process may then return to act 400 for analysis of the next record 210 in database 205.

Returning to act 405, when it is determined that cache list 247 is full, it may then be determined whether a timestamp associated with the current record is more recent than a timestamp associated with tail node 245 in cache list 247 (act 425). If so, no node relating to the current record is created and the process continues to act 427, where it is determined whether the current record is the final record 210 in the database 205. If so, the sorting process ends. However, if the current record 210 is not the final record in database 205, the process returns to act 400 for examination of the next record 210.

However, when the a timestamp associated with the current record is not more recent than a timestamp associated with tail node 245 in cache list 247, floating node pointer 260 is assigned to the tail node 245 (act 430). By using floating node pointer 260, a properly sorted cache list 247 may be maintained without de-allocating and reallocating node memory. Tail node 245 is then rewritten to point to the current record 210 in database 205 (act 435). Next, the proper position for the new node must be determined. To perform this, cache tail pointer 255 may be rewritten to point to the former next-newest node 2.45 (i.e., node tail+1) (act 440). Then, next pointer 295 for the tail node 245 (as referenced by tail pointer 255) may be set to null (act 440), indicating that this node 245 is the new tail node.

The identification of a properly sorted position within cache list 247 may then be identified by comparing a timestamp of floating node 245 with nodes 245 in cache list 247 (act 450). Following identification of its position, floating node 245 may be inserted into cache list 247 (act 455). Floating node pointer 260 may then be set to null (act 460). The process then returns to continues to act 427 described above.

By using a finite set of memory resources and a floating node pointer, the sorting methodology described here may achieve improved performance and decreased memory fragmentation.

Figure 5:
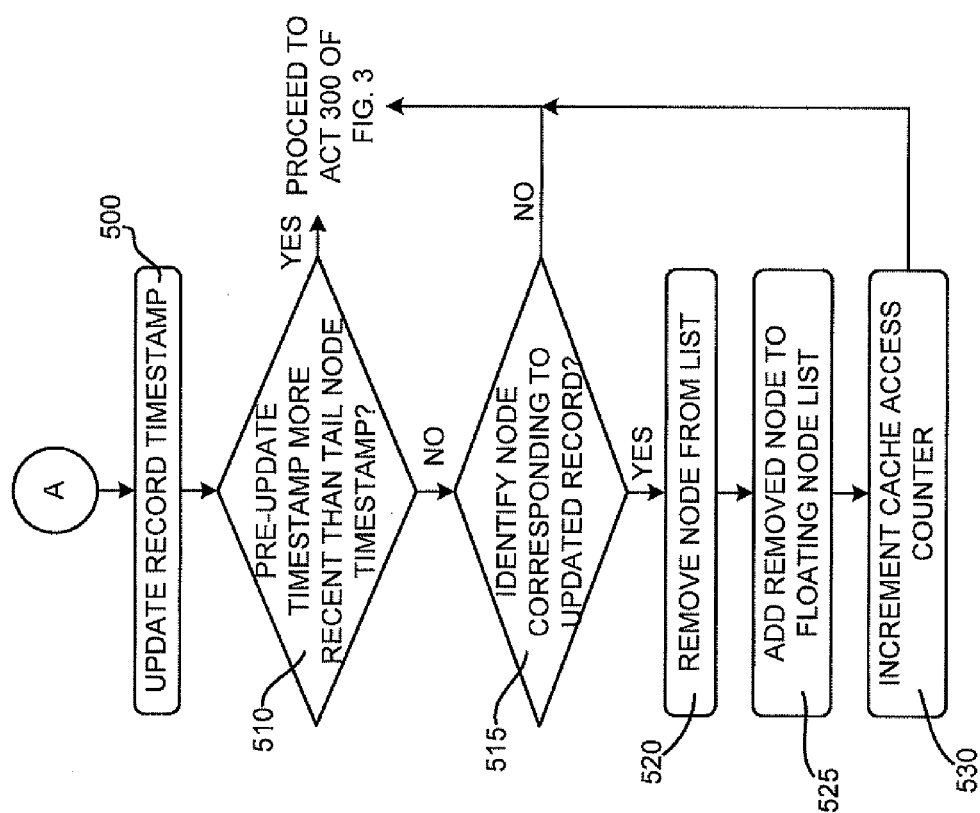

Returning to act 305 of FIG. 3, when it is determined that the update database request received at act 300 is a record update request (e.g., indicating a change to record 210, or indicating access to record 210, etc.), timestamp 225 associated with the modified record 210 may be updated to reflect the time of the modification (act 500, FIG. 5). It should be understood, that additional information in record 210 may be modified at the time of update. Next, it may be determined whether a pre-update timestamp value associated with the updated record is more recent than the node reference by tail pointer 250 (act 510). If so, no records in the cache list 247 are associated with the removed element and processing continues to act 300 for a next update request.

However, if the pre-update timestamp is older than the node designated by tail pointer 255 (i.e., the "newest" node in cache list 247), cache list 247 may be traversed for any node 245 associated with the updated record 210 based on the pre-update timestamp (act 515). If an associated node 245 in cache 240 is identified, the node is removed from the linked list by rewriting the next and previous pointers 290 and 295 in the preceding and subsequent nodes (act 520).

The removed node 245 may then be added to the tail of the floating node list (the head of which is designated by floating node pointer 260), thereby preventing the memory resources allocated to removed node 245 from being de-allocated (act 525). Cache access counter 235 may be incremented, to indicate that a cache hit has occurred and then a fewer number of cache nodes designating old database records are being maintained (act 530). Processing may return to act 300 for receipt of the next database update request.

Figure 6:
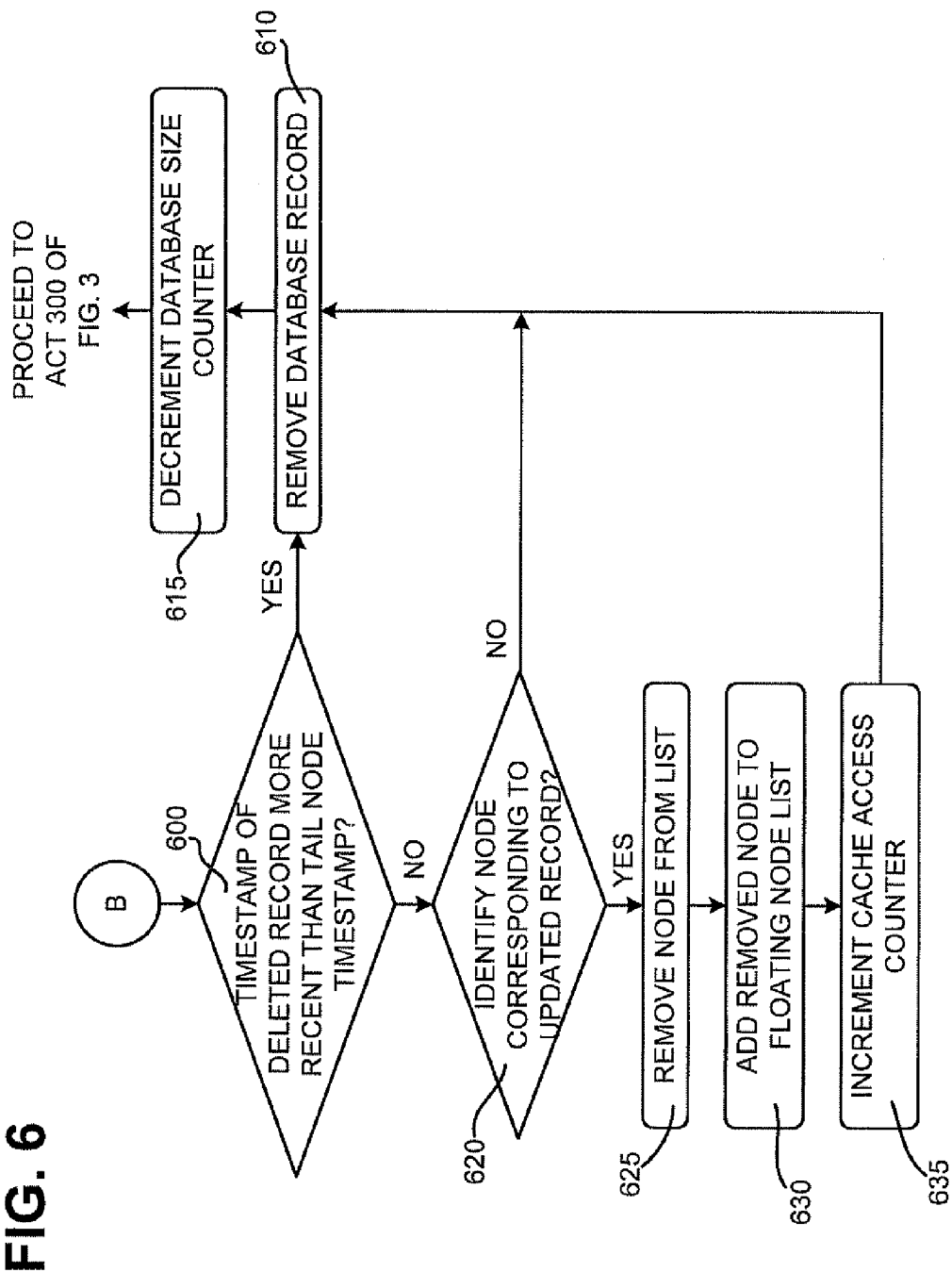

When it is determined that the update database request received at act 300 is a record delete request, it may be determined whether a timestamp value associated with the record to be deleted is more recent than the node reference by tail pointer 255 (act 600, FIG. 6). If so, no records in cache list 247 are associated with the removed element and the database record is deleted (act 610) and the database size counter 230 may be decremented by one (act 615). Processing then returns to act 300 for receipt of the next database update request.

However, if the timestamp associated with the record to be deleted is older than the node designated by tail pointer 255 (i.e., the "newest" node in cache 240), cache list 247 may be traversed for any node 245 associated with the updated record 210 based on the timestamp of the record to be deleted (act 620). If an associated node 245 in cache 240 is identified, the node is removed from the linked list by rewriting the next and previous pointers 290 and 295 in the preceding and subsequent nodes (act 625).

The removed node 245 may then be added to the tail of the floating node list (the head of which is designated by floating node pointer 260), thereby preventing the memory resources allocated to removed node 245 from being de-allocated (act 630). Cache access counter 235 may be incremented, to indicate that a cache hit has occurred and then a fewer number of nodes in cache list 247 designating old database records are being maintained (act 635). Processing may then proceed to act 610 described above for removal of database record 210 and decrementing of database size counter 230.

Conclusion

Implementations consistent with the aspects described herein enable enhance database management by facilitating efficient modification of database records as well as parallel cache memory for optimizing memory allocations.

The foregoing description of the embodiments of the invention provides illustration and description, but is not intended to be exhaustive or to limit the invention to the precise form disclosed. Modifications and variations are possible in light of the above teachings or may be acquired from practice of the invention.

Further, while series of acts have been described with respect to FIGS. 3-6, the order of the acts may be varied in other implementations consistent with the invention. Moreover, non-dependent acts may be performed in parallel.

It will also be apparent to one of ordinary skill in the art that aspects of the invention, as described above, may be implemented in, for example, computer devices, cellular communication devices/systems, methods, and/or computer program products. Accordingly, the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A device-implemented method, comprising:
populating a device-implemented cache with a plurality of data elements, where each of the plurality of data elements points to an associated one of a plurality of records in a memory structure;
identifying one of the plurality of data elements pointing to an oldest one of the plurality of records in the memory structure;
removing the oldest one of the plurality of records from the memory structure; and
removing, from the cache, the one of the plurality of data elements pointing to the oldest one of the plurality of records in the memory structure,
where the one of the plurality of data elements pointing to the oldest one of the plurality of records in the memory structure is added to a floating data element list that maintains a memory allocation previously relating the one of the plurality of data elements pointing to the oldest one of the plurality of records in the memory structure, and where the floating data element list is referenced by a floating node pointer, located in the cache, the floating node pointer comprising the oldest one of the plurality of records in the memory structure and the floating node pointer designating a head of the floating data element list, where the floating node pointer sorts the plurality of data elements without allocations or de-allocations of records of the memory structure.

2. The method of claim 1, where the plurality of data elements comprise N data elements, and where the plurality of records in the memory structure comprise N oldest records in the memory structure, where N is an integer.

3. The method of claim 1, further comprising:
sorting the plurality of data elements in the cache, based on an age of each of the associated ones of the plurality of records in the memory structure;
associating a head pointer with the one of the plurality of data elements pointing to the oldest one of the plurality of records in the memory structure,
where the identifying the one of the plurality of data elements pointing to the oldest one of the plurality records in the memory structure comprises identifying the one of the plurality of data elements associated with the head pointer; and
associating a tail pointer with one of the plurality of data elements pointing to a newest one of the plurality of records in the memory structure.

4. The method of claim 3, where each of the plurality of records in the memory structure and each of the associated ones of the plurality of data elements in the cache include timestamp indicative of a time that each of the plurality of records were last accessed, and where the sorting of the plurality of data elements, in the cache, is performed based on the timestamps.

5. The method of claim 3, where the sorting the plurality of data elements, in the cache, further comprises:
providing a next pointer in each of the plurality data elements pointing to a following data element in the cache; and
providing a previous pointer in each of the plurality of data elements pointing to a preceding data element in the cache.

6. The method of claim 5, further comprising:
associating the head pointer with one of the plurality of data elements that is referenced by the next pointer in the one of the plurality of data elements that is currently associated with the head pointer.

7. The method of claim 5, where the populating the cache further comprises:
determining that the cache is full;
determining that a current record is older than the one of the plurality of data elements associated with the tail pointer;
assigning a floating node pointer to the one of the plurality of data elements associated with the tail pointer;
rewriting the one of the plurality of data elements associated with the tail pointer to point to the current record;
assigning the tail pointer to a next newest data element in the cache;
identifying a sorted position for the one of the plurality of data element associated with the floating node pointer; and
inserting the one of the plurality of data elements associated with the floating node pointer into the cache.

8. The method of claim 7, where the identifying a sorted position for the one of the plurality of data elements associated with the floating node pointer comprises:
comparing the timestamp of the one of the plurality of data elements associated with the floating node pointer to the timestamp of each of the plurality of data elements in the cache.

9. The method of claim 1, comprising:
determining whether the memory structure is full; and
populating the cache when it is determined that the memory structure is full.

10. The method of claim 1, comprising:
determining whether the cache should be populated based on a value of a cache access counter; and
populating the cache when it is determined that the cache should be populated.

11. The method of claim 10, where the cache comprises a doubly linked list including the plurality of data elements, and where the cache further comprises a floating data element pointer associated with data elements detached from the doubly linked list.

12. The method of claim 11, where the determining whether the cache should be populated further comprises:
determining whether a value associated with the cache access counter meets a predetermined value or range of values; and
populate the cache based on a comparison of the value and the predetermined value or range of values.

13. The method of claim 12, where the determining whether a value associated with a cache access counter meets a predetermined value or range of values, further comprises:
counting a number of accesses of the cache;
determining when the number of accesses of the cache is a multiple of a total number of data elements in the cache; and
populating the cache based on a comparison of the number of accesses and the total number of data elements.

14. The method of claim 10, further comprising:
determining whether the memory structure is full; and
determining that the cache should be populated when it is determined that the memory structure is full.

15. The method of claim 1, further comprising:
adding a new record to the memory structure.

16. The method of claim 1, where the memory structure comprises a database.

17. The method of claim 16, where the database is to maintain digital rights management information and where the database is maintained in a memory of a mobile computing device.

18. A method, comprising:
populating a non-transitory cache with a plurality of nodes, where each of the plurality of nodes points to an associated one of a plurality of records in a non-transitory memory structure;
receiving a request to delete one of the plurality of records from the memory structure;
determining whether an age of the one of the plurality of records to be deleted is more recent than an age of the most recent node in a plurality of nodes;
determining whether a timestamp associated with the one of the plurality of records to be deleted indicates that the one of the plurality of records is more recent than the most recent node and either:
deleting the one of the plurality of records to be deleted without associating a node of the plurality of nodes with the one of the plurality of records to be deleted, when the timestamp associated with the one of the plurality of records to be deleted indicates that the one of the plurality of records is more recent than the most recent node, or
determining a node of the plurality of nodes associated with the one of the plurality of records to be deleted,
removing the associated node from the plurality of nodes,
adding the one of the plurality of nodes associated with the one of the plurality of records to be deleted to a floating node list that is referenced by a floating node pointer, located in the cache, the floating node pointer comprising an oldest one of the plurality of records in the memory structure and the floating node pointer designating a head of the floating node list, where the floating node pointer sorts the plurality of data elements without allocations or de-allocations of records of the memory structure, and
deleting the one of the plurality of records to be deleted, when the timestamp associated with the one of the plurality of records to be deleted indicates that the one of the plurality of records is not more recent than the most recent node.

19. The method of claim 18, where the cache includes a doubly linked list, where each node in the plurality of nodes includes a next pointer pointing to a next oldest node in the plurality of nodes and a previous pointer pointing to a next newest node in the plurality of nodes.

20. The method of claim 19, further comprising:
rewriting a next pointer, associated with one of the plurality of nodes identified by a previous pointer of the one of the plurality of nodes associated with the one of the plurality of records to be deleted, to point to one of the plurality of nodes identified by a next pointer of the one of the plurality of nodes associated with the one of the plurality of records to be deleted;
rewriting a previous pointer, associated with the one of the plurality of nodes identified by the next pointer of the one of the plurality of nodes associated with the one of the plurality of records to be deleted, to point to the one of the plurality of nodes identified by the previous pointer of the one of the plurality of nodes associated with the one of the plurality of records to be deleted; and removing the one of the plurality of records to be deleted from the memory structure.

21. The method of claim 19, further comprising:

rewriting a next pointer, associated with one of the plurality of nodes identified by a previous pointer of the one of the plurality of nodes associated with the record to be modified, to point to one of the plurality of nodes identified by a the next pointer of the one of the plurality of nodes associated with the one of the plurality of records to be modified;

rewriting a previous pointer, associated with the one of the plurality of nodes identified by the next pointer of the one of the plurality of nodes associated with the one of the plurality of records to be modified, to point to the one of the plurality of nodes identified by the previous pointer of the one of the plurality of nodes associated with the one of the plurality of records to be modified; and adding the one of the plurality of nodes associated with the one of the plurality of records to be modified to the floating node list.

22. A non-transitory memory device having stored thereon sequences of instructions executable by at least one processor, comprising:

one or more instructions to receive a request to add a record to a database;

one or more instructions to determine whether the database is full;

one or more instructions to identify a data element, in a cache memory containing a plurality of data elements, pointing to an oldest record in the database when it is determined that the database is full;

one or more instructions to remove the oldest record from the database;

one or more instructions to remove the identified data element in the cache memory and adding the identified data element to a floating data element list that preserves a memory allocation of the identified data element, in the cache memory, and that is referenced by a floating node pointer, located in the cache memory, the floating node pointer comprising an oldest one of the plurality of records in the memory structure and the floating node pointer designating a head of the floating data element list, where the floating node pointer sorts the plurality of data elements without allocations or de-allocations of records of the database; and one or more instructions to add the record to the database after removing the identified element.

23. The memory device of claim 22, further comprising:

one or more instructions to determine whether the cache memory should be populated based on a value of a cache access counter; and one or more instructions to populate the cache memory with a plurality of data elements, where each of the plurality of data elements corresponds with one of a plurality of records in the database, where at least one of the corresponding plurality of records in the database comprises an oldest record in the database.

24. The memory device of claim 23, where the one or more instructions for determining whether the cache memory should be populated further comprise:

one or more instructions to determine that the database is full;

one or more instructions to determine whether a cache access counter value is a multiple of a maximum number of data elements in the cache memory; and one or more instructions to populate the cache based on a comparison of the number of accesses and the total number of data elements.

25. A computing device comprising:

a processor; and a memory to store instructions that when executed by the processor, cause the processor to:

receive a request to add a node to a sorted list of nodes stored in a cache, where the sorted list of nodes is sorted based on a timestamp associated with each node in the sorted list of nodes, with a head node being an oldest node in the sorted list and a tail node being a newest node in the sorted list;

determine whether the node to be added to the sorted list of nodes is older than the tail node;

assign a floating pointer, located in a floating data element list, in the cache, to the tail node when it is determined that the node to be added to the sorted list of nodes is older than the tail node, the floating pointer comprising an oldest one of the sorted list of nodes and the floating pointer designating a head of the floating element list, where the floating pointer sorts the sorted list of nodes without allocations or de-allocations of records of the memory;

rewrite the tail node to represent the node to be added to the sorted list of nodes;

rewrite a tail pointer to point to a next newest node in the sorted list of nodes;

identify a sorted position for the node to be added to the sorted list of nodes; and insert the node to be added into the sorted list of nodes at the identified sorted position.

\* \* \* \* \*